United States Patent
Cardona et al.

(10) Patent No.: US 10,166,907 B2
(45) Date of Patent: Jan. 1, 2019

(54) RETRACTOR WITH SPACE-SAVING FEATURES

(71) Applicant: Valeda Company, Fort Lauderdale, FL (US)

(72) Inventors: Edgardo Cardona, Fort Lauderdale, FL (US); Patrick Girardin, Fort Lauderdale, FL (US)

(73) Assignee: Valeda CompanyFL (US)

( * ) Notice: Subject to any disclaimer, the term of this patent is extended or adjusted under 35 U.S.C. 154(b) by 0 days.

(21) Appl. No.: 15/339,360

(22) Filed: Oct. 31, 2016

(65) Prior Publication Data

US 2018/0118088 A1    May 3, 2018

(51) Int. Cl.
| | | |
|---|---|---|
| *B60P 7/08* | (2006.01) | |
| *B65H 75/14* | (2006.01) | |
| *B65H 75/44* | (2006.01) | |
| *A61G 3/08* | (2006.01) | |

(52) U.S. Cl.
CPC .......... *B60P 7/0846* (2013.01); *A61G 3/0808* (2013.01); *B65H 75/14* (2013.01); *B65H 75/4402* (2013.01)

(58) Field of Classification Search
CPC .... B60P 7/0846; B65H 75/4402; B65H 75/14
USPC .................. 410/7, 10–12, 19–23, 100, 103; 24/68 CD; 254/280, 390, 391
See application file for complete search history.

(56) References Cited

U.S. PATENT DOCUMENTS

| | | | | |
|---|---|---|---|---|
| 745,013 | A * | 11/1903 | Heisey | B60P 7/083 254/217 |
| 902,647 | A * | 11/1908 | Day | B66D 3/14 24/909 |
| 4,045,002 | A * | 8/1977 | Miller | B60P 7/083 410/103 |
| 5,494,387 | A * | 2/1996 | Ruegg | B60P 7/083 410/100 |
| 6,287,060 | B1 * | 9/2001 | Girardin | B60R 22/20 410/11 |
| 2002/0114679 | A1 * | 8/2002 | Craft | A61G 3/0808 410/7 |
| 2012/0292583 | A1 * | 11/2012 | Lob | B66D 3/04 254/390 |

* cited by examiner

*Primary Examiner* — Stephen T Gordon
(74) *Attorney, Agent, or Firm* — Daniel A. Tallitsch; Baker McKenzie LLP

(57) ABSTRACT

A retractor may include various features that reduce the amount of space necessary to secure an object, for example, a wheelchair in a vehicle. In one embodiment, the webbing is designed to come off of the top of the retractor spool, which shifts the webbing take-off point from the spool rearward, as compared to prior art retractors. In another embodiment, the retractor is provided with a webbing guide that rotates around at least a portion of the circumference of the retractor spool. The rotatable guide also shifts the take-off point from the webbing guide rearward, as compared to prior art retractors. In yet another embodiment, the retractor is provided with both a rotatable webbing guide and webbing that comes off of the top of the spool.

15 Claims, 5 Drawing Sheets

RETRACTOR WITH SPACE-SAVING FEATURES

CROSS-REFERENCE TO OTHER APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to retractors. In some embodiments, the retractor has a webbing guide that prevents twists from being wound onto the spool and keeps the webbing centered on the spool and/or supplies webbing off of the top of the spool. In one application, the retractors may be used with the wheelchair securement system disclosed in U.S. Patent No. 62/341,570, which is incorporated herein in its entirety by reference.

Background Art

Wheelchair securement retractors often include several feet of webbing or other strap. At its proximal end, the webbing is attached to a spool. At its free end, the webbing is attached to an anchor, usually a hook, which engages and secures a wheelchair. When drawing webbing out from the retractor spool to secure the hook to the wheelchair, the operator may introduce twists into the webbing that can become wound onto the retractor spool when the webbing is retracted. These twists may jam the retractor or otherwise interfere with proper functioning of the retractor, while also increasing wear of the webbing. Similarly, as webbing enters the retractor it may go off-center and possibly interfere with and get damaged by the retractor gear/teeth.

Currently there are several forms of webbing guides. These webbing guides serve the same purpose of keeping the webbing centered while being wound around a spool, and some may also prevent twisting of the webbing as well. For instance, it is common in the wheelchair securement industry to find a retractor cover with a "mouth" designed specifically to aid in guiding the webbing. Sometimes, retractors will include a small separate component mounted forward of the retractor frame. In all instances of existing webbing guides, their designs are limited to allow webbing to exit the retractor at a single point and offer a limited range of motion with respect to that webbing as it exits the retractor. In short, existing guides serve as a "single-point" webbing guide unable to adapt to any variation from the angles of the webbing as it leaves the retractor. Because of their fixed-angle designs, existing retractors used in a wheelchair environment where space constraints are significant take up more space than necessary, as the webbing must exit the spool typically straight off the bottom at a zero (0) degree angle, and then must pass through a separate webbing guide in the form of a retractor housing or other component mounted forward of the frame, both of which continue to take up much needed space.

SUMMARY OF THE PRESENT EMBODIMENTS

The embodiments disclosed and claimed herein solve at least some of the short-comings of the existing webbing guide designs. In one embodiment, a webbing guide is pivotal about an axis of the spool which allows the belt to come off the spool of the retractor at any angle. This design may shift the webbing take-off point from the retractor rearward, thereby reducing the space needed for proper wheelchair securement while at the same time preventing twists and off-centering of the webbing, whereby the webbing will not interfere with and become damaged by the retractor teeth/gearing.

In a second embodiment, the retractor is designed so that the webbing comes off of the top of the retractor spool, as opposed to an underside of the retractor spool like the prior art. This design may also shift the take-off point rearward and further eliminate some of the space used up by existing retractors.

In a third embodiment, the aspects of the first and second embodiment are combined.

In some embodiments, the housing for the retractor may have an open top and may be designed to protect users from contact with exposed gear/teeth and unintentional injury as a result of fingers entering the retractor top.

In other embodiments, the retractor may be designed in a way as to limit the range of motion of a webbing guide. For example, some international standards call for an operating range for securement. If those angles, for example, were to be from 30 degrees to 50 degrees, then the retractor can be designed to limit the rotating webbing guide to be operable only within that range.

In other embodiments, the webbing guide may feature a visual indicator to alert the user of a desired or optimal operation angle (or range of angles). This visual indicator may comprise many forms such as numerical values indicating the actual range, or a color system which will indicate via a positive or negative color value that the belt angles are within the operating range for effective securement.

In yet other embodiments, a lockable feature for the rotating webbing guide may be provided. Such a feature could serve to hold the webbing guide at an optimal angle for various purposes such as maintenance, storage, or to facilitate easier removal of the hooks from the retractor.

In even yet other embodiments, the webbing guide may be provided with a spring loaded or tension bias. Such a bias could facilitate pushing the webbing guide to a predetermined angle, such as 90 degrees, for example. When at 90 degrees, the webbing guide is at an angle that facilitates effective webbing ingress during a crash—resulting in improved rear excursions. Without a spring loading or tension bias, it would take the webbing itself to 'push' the webbing guide up to the 90 degree angle, therefore creating more friction which may prevent easy ingress of webbing through the webbing guide and into the retractor housing.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
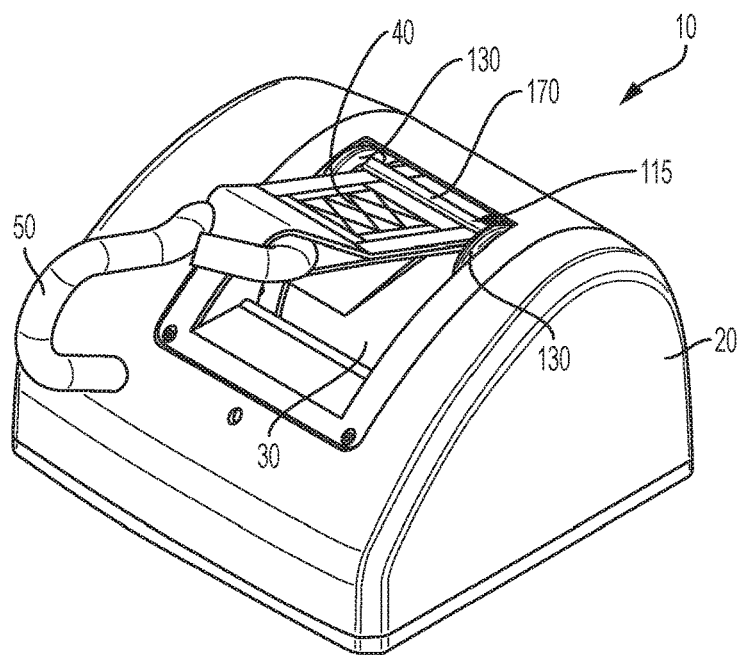
FIG. 1 is a perspective view of an example embodiment of a retractor that includes space-saving features.
Figure 2:
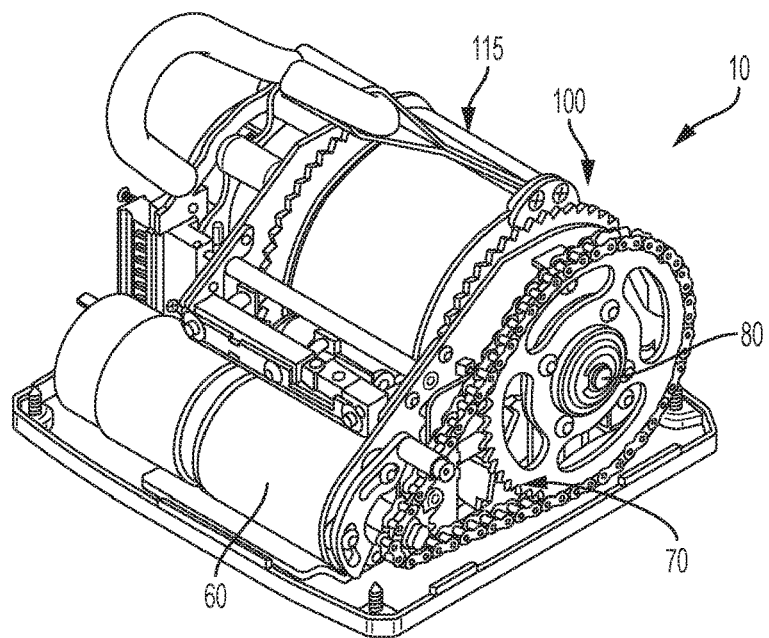
FIG. 2 is a second perspective view of the retractor with the housing removed.
Figure 3:
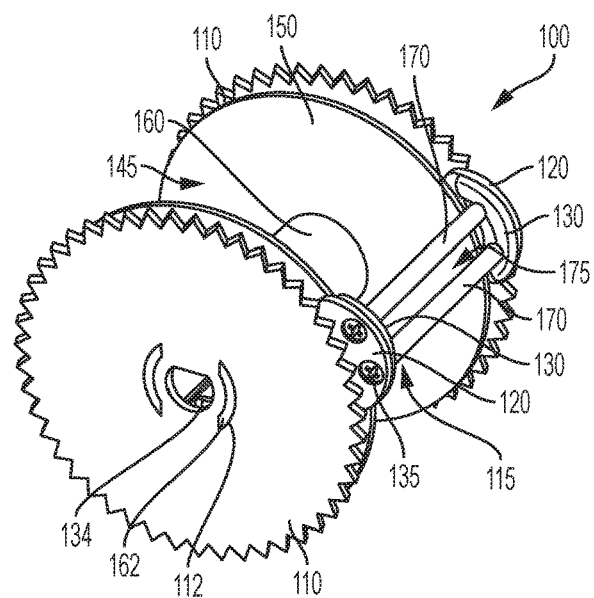
FIG. 3 is a perspective view of the spool unit of the retractor.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

An embodiment of a retractor 10 that includes space-saving features is depicted in FIGS. 1-5. The retractor 10 may include a housing 20 with an opening 30 for passing webbing 40 (or other types of belts or straps) from a spool unit 100. The webbing 40 may be secured at its proximal end to the spool unit 100 and a length of the webbing 40 may be wound around the spool unit 100, as shown. The spool unit 100 of the retractor 10 may be powered in one or both directions using a motor 60, speed reduction gearing 70, and drive shaft 80. The retractor 10 may additionally or alternatively be provided with spring-biasing which causes the spool unit 100 to pull webbing 40 onto the spool unit 100. The webbing 40 may be configured to leave the spool unit 100 at the top of the spool unit 100, as shown, or may be configured to leave the spool unit 100 at a bottom of the spool unit 100. The webbing 40 may be secured at its terminal end to an anchor, such as the hook 50 shown in the figures, for attachment to a wheelchair or other cargo.

The spool unit 100 may comprise one or more sprockets 110, one or more guide plates 120, one or more webbing pads 130, one or more bearings 140, one or more end plates 150, one or more mandrels 160, and one or more webbing guide members 170. As shown, the spool unit 100 may include two sprockets 110 disposed at opposite sides of the spool unit 100. Each sprocket 110 may comprise a plurality of teeth 116 around its periphery for engagement with a locking pawl (not shown). The locking pawl (not shown) may selectively engage with the teeth 116 to lock the spool unit 100 in one or both directions (i.e., preventing webbing 40 from being pulled out of the retractor 10, and/or prevent webbing 40 from being wound into the retractor 10). The sprocket 110 may also include a central hole 114 for receiving the drive shaft 80 there through. The central hole 114 may be provided with a shape that corresponds to the shape of the drive shaft 80, whereby torque from the motor 60 may be communicated to the spool unit 100 through the speed reduction gearing 70, drive shaft 80 and sprocket 110. The sprocket may also include one or more holes (or female engagement members) 112 for receiving one or more projections (or male engagement members) 162 on the mandrel 160, whereby torque from the motor 60 may be further communicated through the sprocket 110 and to the mandrel 160. The holes 112 and projections 162 may have complementary shapes, such as the crescent shapes shown in the figures. In one embodiment, the projections 162 may be press fit into the holes 112 to hold the spool unit 100 together as a unit and to align the teeth 116 and the central holes 114 of the two sprockets 110.

As shown, the spool unit 100 may also include a spool 145 for holding webbing 40. The spool 145 may be defined by one mandrel 160 with two, spaced-apart end plates 150 affixed to the mandrel 160 near or at its opposite ends. Each end plate 150 may include a central opening 152 with an inwardly directed tab 154. The mandrel 160 may be configured in a circular, or semi-circular shape for insertion into the central openings 152 of the end plates 150, whereby webbing 40 may be connected to the mandrel 160 and wound around it, between the end plates 150, into a cylindrical shape. The mandrel 160 may include grooves 164 that are used to lock the end plates 150 into place. To install the end plates 150, the mandrel 160 may be compressed a small amount so that the end plates 150 may be pushed into the grooves 164. Once the mandrel 160 is no longer compressed, it will return to its original diameter, captivating and locking the end plates 150 into the grooves 164. As shown, the mandrel 160 is semi-circular in shape with a gap 166 that receives the tab 154 on the end plates 150. The tabs 154 are configured for engagement in the gap 166 of the mandrel 160, whereby torque from the motor 60 may be further communicated through the mandrel 160 and to the end plates 150, whereby the mandrel 160 and end plates 150 rotate together.

Figure 7:
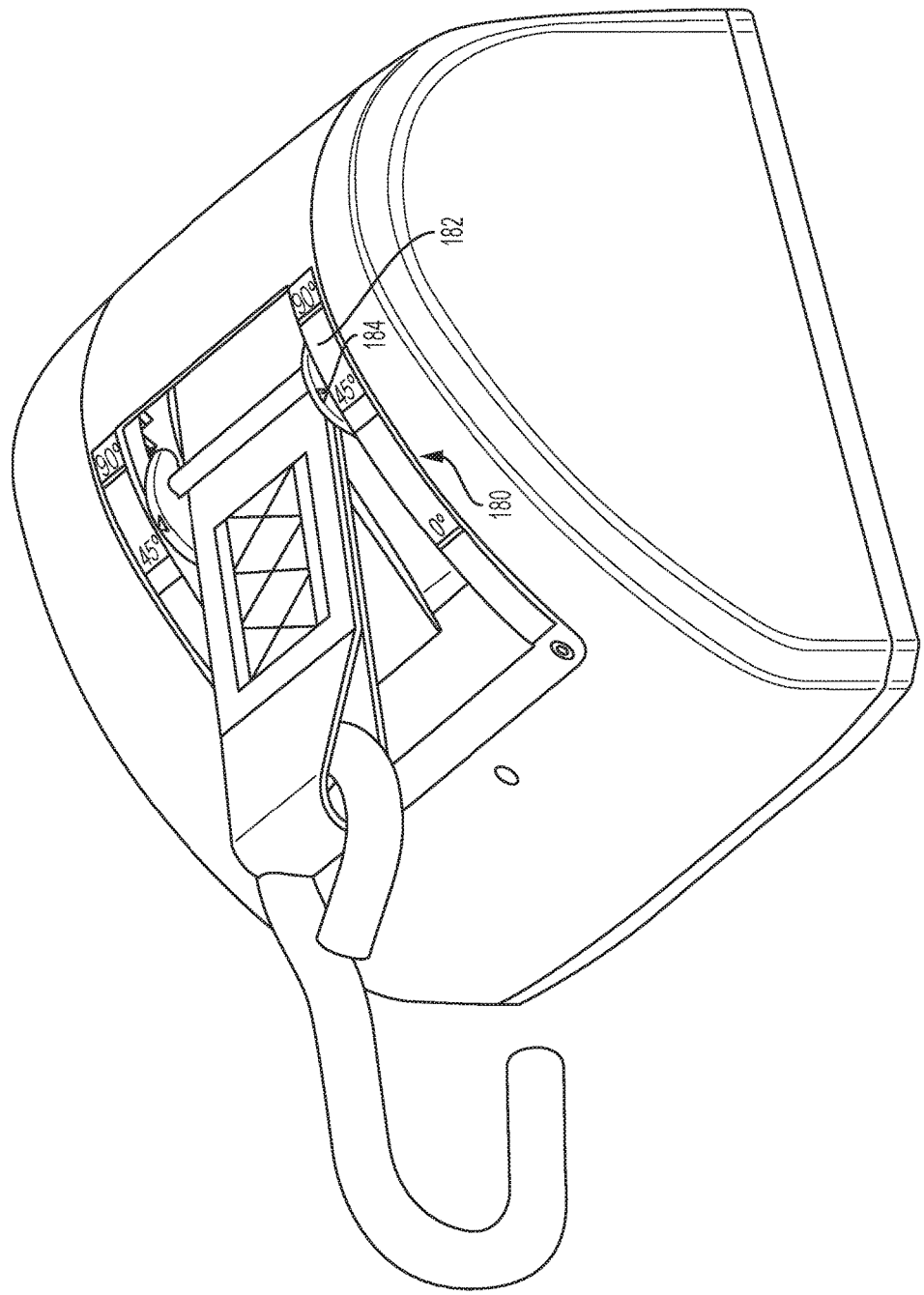

Further, the spool unit 100 may include a rotatable webbing guide 115 with a guide opening 175 that receives and guides webbing 40 straight onto the spool 145 and prevent twists in the webbing 40 from being introduced onto the spool 145. The webbing guide 115 is rotatable about a periphery of the spool 145. The webbing guide 115 maintains the webbing 40 aligned with the spool 145, preventing the webbing from crossing the sprockets 110 therefore reducing premature wear. The opening 175 of the webbing guide 115 also presents a narrow, elongated slot that allows the webbing 40 which prevents twisting of the webbing 40 within the spool 145. The webbing guide 115 may further ensure that the webbing 40 is always presented in a direct path with the circumference of the wound webbing 40 on the spool 145, whereby the loads at the retractor and on the anchoring point may be reduced. The webbing guide 115 may include a visual indicator 180, such as the one shown in FIG. 7, which alerts a user via a numerical or color value that the belt angle is optimized for effective wheelchair securement. As shown in FIG. 7, the visual indicator 180 may comprise an arrow indicator 182 on the webbing guide 115 that is adjacent a colored or lined gauge 184, that may have the angle number (such as "45°") and/or a color (such as green) indicating a normal and/or optimal operating angle, and an angle number (such as "0°" and/or "90°") and/or a color (such as red) indicating an upper and/or lower angle limit. The webbing guide 115 may further be provided with a spring bias, which reduces excursions by positioning the guide 115 in an ideal geometry to maximize webbing ingress.

The guide opening 175 may be defined by two, oppositely positioned guide plates 120 that are separated by a pair of spaced-apart webbing guide members 170. The guide opening 175 may alternatively be defined by the pair of webbing guide members 170 and webbing pads 130 that are disposed between the webbing guide members 170 and the guide plates 120. The 15 webbing guide members 170 may comprise cylinders or other longitudinal members that have curved or smooth edges and/or surfaces to reduce wear on the webbing 40 as it passes through the guide opening 175 Similarly, the webbing pads 130 are provided with curved or smooth edges and/or surfaces to reduce wear on the webbing 40 as it passes through the guide opening 175. In other embodiments, the guide opening 175 may be provided by a unitary structure with 20 smooth or curved edges. As shown, the guide plates 120 may include apertures 124 that align with apertures 134 on the webbing pads 130. Apertures 124 and 134 may receive screws 135 that engage with threaded openings 174 at the opposite ends of the webbing guide members 170. In this respect, screws hold together guide plates 120, webbing pads 130, and webbing guide members 170, where the webbing pads 130 are captivated between the webbing guide members 170 and guide plates 120 once the screws are torqued down.

Figure 4:
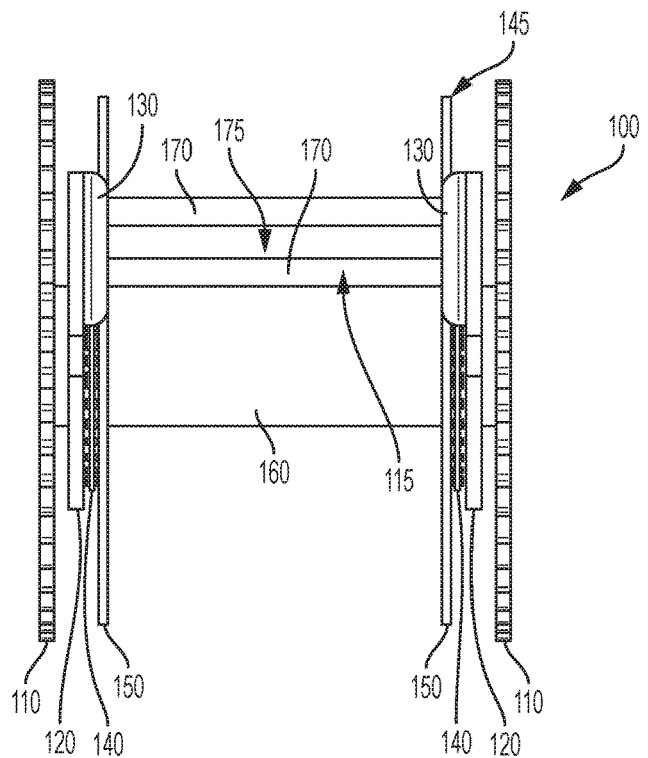
FIG. 4 is a front view of the spool unit.
Figure 5:
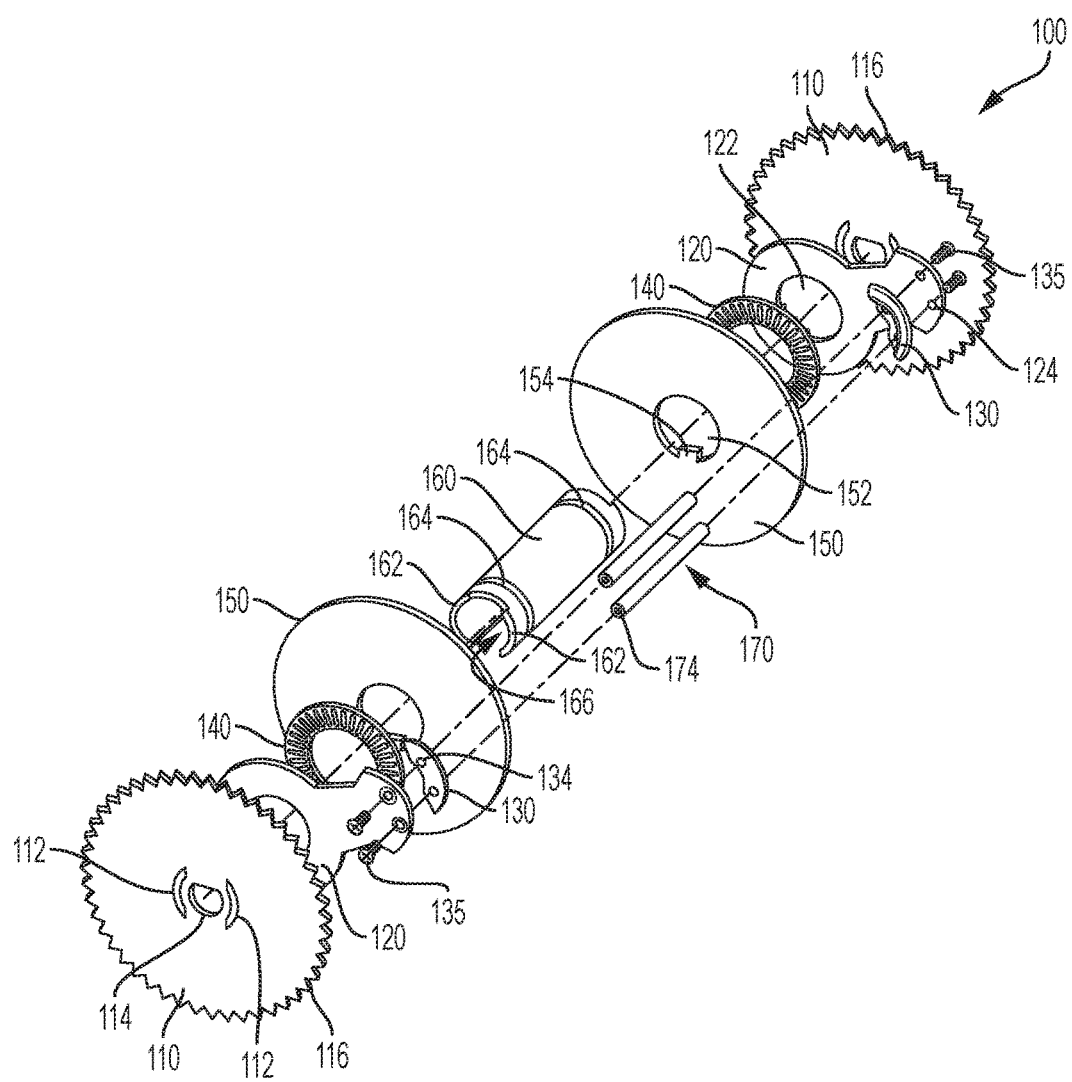
FIG. 5 is an exploded view of the spool unit.

The guide plates 120 of the webbing guide 115 may include a central opening 122 with a diameter slightly larger than the diameter of the mandrel 160, whereby the central opening 122 can receive the mandrel 160 and the webbing guide 115 can rotate about the mandrel. The width of the webbing guide 115 is slightly larger than the width of the spool 145, whereby the guide plates 120 are positioned outside of the end plates 150, but inside of the sprockets 110, as best shown in FIG. 4. Thrust bearings 140 are provided between each set of end plates 150 and guide plates 120, which allows the webbing guide 115 to rotate freely about its axis of rotation, independent from the remaining components of the spool unit 100, even when the webbing 40 enters the guide opening 175 at an angle and pulls the webbing guide 115 laterally. In some embodiments, the webbing guide 115 is capable of guiding the webbing 40 onto a spool 145, permitting it to enter and exit the retractor case at different angles along a 360° rotation. The webbing guide 115 freely rotates 360° about the axis of the spool 145 allowing the webbing 40 to exit the retractor case at different angles. As a result, retractors 10 can be installed in various positions reducing the space required to secure an object. For instance, the retractor 10 shown in FIG. 2 could be turned around where the webbing 40 and hook 50 exit from the rear of the retractor 10 (in which case the webbing 40 would be coming off of the bottom of the spool 145, rather than the top of the spool 145 as shown). In some other embodiments, the rotation of the webbing guide 115 may be limited to a range of angles. For instance, the embodiment shown in FIG. 1 includes a housing 20 with an opening 30 that restricts the rotational movement of the webbing guide to a certain, predetermined range of angles.

Figure 6A:
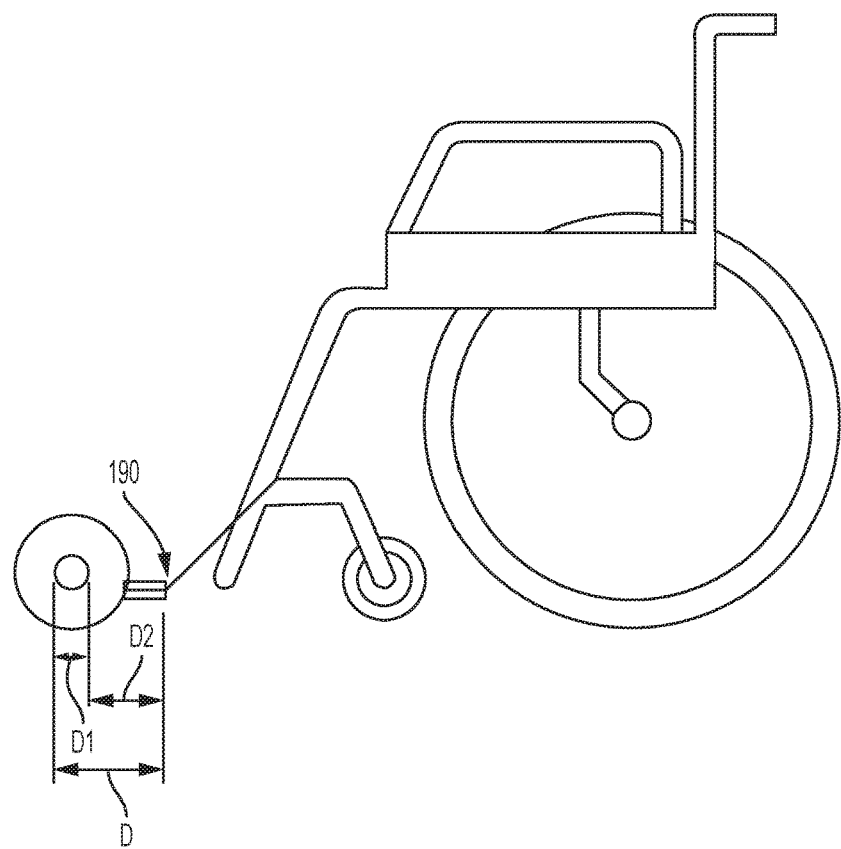
FIG. 6A is a diagram showing a wheelchair secured from the front with a typical prior art retractor.
Figure 6B:
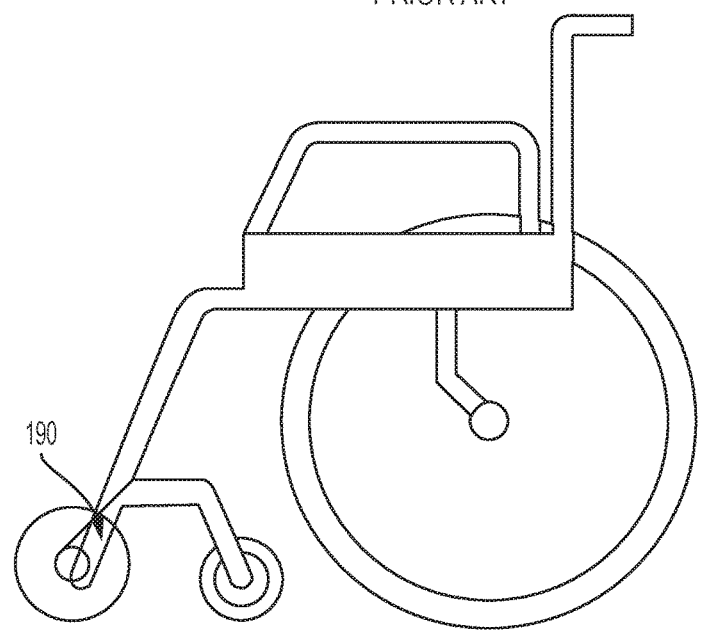
FIG. 6B is a diagram showing a wheelchair secured from the front with an embodiment of the retractor described herein; and, FIG. 7 is a perspective view of a second example embodiment of a retractor that includes space-saving features and a visual indicator.

The retractor 10 depicted in FIGS. 1-5 (which includes a rotatable webbing guide and webbing that comes off of the top of the spool) may provide space savings in a wheelchair securement system, where webbing ideally should extend between the retractor and the wheelchair at an angle of approximately 35-55°, when compared to prior art systems that present webbing off of the bottom of the spool and include a fixed webbing guide positioned forward of the retractor. The space savings are best depicted in FIGS. 6A and 6B. By taking the webbing off of the top of the spool (FIG. 6B), rather than the bottom of the spool (FIG. 6A), the take-off point 190 from the retractor shifts rearward to the trailing edge of the spool, rather than the leading edge of the spool, and a space savings of $D_1$ is realized. Furthermore, allowing the webbing guide to rotate (FIG. 6B), rather than be positioned fixedly at the front of the retractor (FIG. 6A), the space $D_2$ taken up by the prior art webbing guide is also saved. Incorporating both features (i.e., rotatable webbing guide and webbing taken off the top) into a retractor may permit the wheelchair to be secured a total distance D ($=D_1+D_2$) closer to the retractor, thereby shrinking the size of the space needed to secure a wheelchair. The savings will depend upon the type of retractor being used; in some instances, the space savings may be up to 6 inches (15.24 centimeters) or more. Use of the same configuration for the retractor(s) at the rear of the wheelchair (if used) may double the total space savings.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A retractor comprising: a spool disposed inside of a housing, a guide having a rotational movement whereby the guide is rotatable around at least a portion of a circumference of said spool and with respect to said housing, and a belt being wound about said spool and being passable through a guide opening in said guide, wherein the housing comprises an opening that restricts the rotational movement of the guide within a predetermined range of angles.

2. The retractor of claim 1, wherein the belt comes off of the top of the spool.

3. The retractor of claim 1, wherein the spool comprises a mandrel with end plates positioned at least near opposite sides of the mandrel, and the guide comprises two guide plates that are separated by spaced-apart guiding members, wherein an upper and lower boundary of the guide opening is defined by the guiding members.

4. The retractor of claim 3, wherein the guide plates have openings that receive the opposite sides of the mandrel, whereby the guide may rotate about the mandrel.

5. The retractor of claim 4, wherein the guide plates are separated from the end plates by thrust bearings.

6. The retractor of claim 3, wherein the belt comes off of the top of the spool.

7. A retractor comprising: a spool, a guide having a rotational movement whereby the guide is rotatable around at least a portion of a circumference of said spool, and a belt being wound about said spool and being passable through a guide opening in said guide, wherein the spool comprises a mandrel with end plates positioned at least near opposite sides of the mandrel, and the guide comprises two guide plates that are separated by spaced-apart guiding members, wherein an upper and lower boundary of the guide opening is defined by the guiding members.

8. The retractor of claim 7, wherein the guide plates have openings that receive the opposite sides of the mandrel, whereby the guide may rotate about the mandrel.

9. The retractor of claim 8, wherein the guide plates are separated from the end plates by thrust bearings.

10. The retractor of claim 9 further comprising a housing with an opening that restricts the rotational movement of the guide within a predetermined range of angles.

11. The retractor of claim 10, wherein the belt comes off of the top of the spool.

12. A retractor comprising: a spool, a guide positioned adjacent a circumference of said spool, and a belt being wound about said spool, coming off the top of the spool, and being passable through a guide opening in said guide, wherein the guide has a rotational movement whereby the guide is rotatable around at least a portion of the circumference of said spool, and wherein the spool comprises a mandrel with end plates positioned at least near opposite sides of the mandrel, and the guide comprises two guide plates that are separated by spaced-apart guiding members, wherein an upper and lower boundary of the guide opening is defined by the guiding members.

13. The retractor of claim 12, wherein the guide plates have openings that receive the opposite sides of the mandrel, whereby the guide may rotate about the mandrel.

14. The retractor of claim 13, wherein the guide plates are separated from the end plates by thrust bearings.

15. The retractor of claim 14 further comprising a housing with an opening that restricts the rotational movement of the guide within a predetermined range of angles.

\* \* \* \* \*